Feb. 17, 1959     H. L. POOL     2,873,756
DEVICE FOR CONTROLLING AN ACTUATOR BY THE
TRANSLATION OF A SHOCK WAVE
Filed May 14, 1956

INVENTOR.
HENRY L. POOL
BY
his ATTORNEYS.

United States Patent Office 2,873,756
Patented Feb. 17, 1959

2,873,756

DEVICE FOR CONTROLLING AN ACTUATOR BY THE TRANSLATION OF A SHOCK WAVE

Henry L. Pool, East Hampton, N. Y., assignor to Fairchild Engine and Airplane Corporation, Bay Shore, N. Y., a corporation of Maryland Application May 14, 1956, Serial No. 584,518

6 Claims. (Cl. 137—87)

This invention relates to a pressure control system wherein a shock wave produced in a passage is utilized to trigger the operation of an actuating device.

If the flow of fluid in a nozzle or passage changes from supersonic to subsonic, a shock wave is introduced at some point in the channel of the nozzle. The pressure downstream of the shock wave is substantially higher than the pressure immediately upstream of the shock wave. In a conventional De Laval nozzle having an overexpanding discharge end, the shock wave is normal to the direction of the flow. Therefore, if the pressure at the discharge end of the nozzle is maintained substantially constant, a very small pressure variation at the inlet end of the nozzle will cause the plane of the shock wave to move upstream or downstream in the nozzle, the shock wave moving upstream as the pressure at the inlet end of the nozzle decreases, and moving downstream as the pressure at the inlet end of the nozzle increases.

The present invention utilizes this phenomenon, that is to say, the creation of a shock wave in a channel or passage and the movement of the plane of the shock wave upstream or downstream in response to pressure variations, to operate a pressure controlled device, such as an actuator. In accordance with the present invention, an opening or tap is formed in the wall of the channel or passage, and the tap is connected via a conduit to the pressure controlled device. Thus, the pressure controlled device will be operative in response to a high pressure when the shock wave is upstream of the tap, and in response to a low pressure when the shock wave is downstream of the tap. The pressure controlled device may, if desired, operate some other device, such as a valve, a warning device, a switch, etc.

For a complete understanding of the present invention and specific applications thereof, reference may be had to the detailed description which follows and to the accompanying drawings in which.

Figure 1:
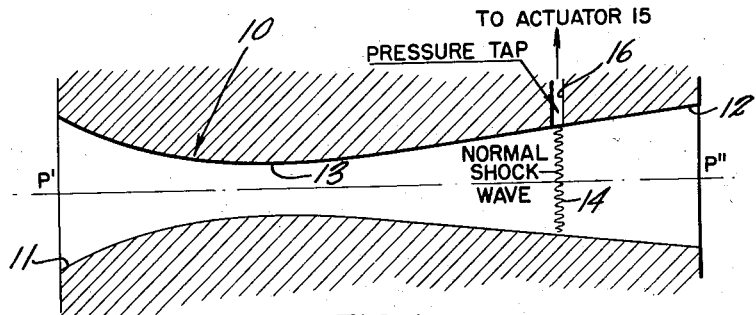
Figure 1 is a schematic representation of the present invention embodying an overexpanded De Laval type nozzle.

Figure 1 of the drawings illustrates a De Laval nozzle 10 having an inlet end 11, an overexpanded discharge end 12, and an intermediate throat 13. The pressure at the inlet end of the nozzle is represented in Figure 1 of the drawings by the reference smybol P', and the pressure at the discharge end is represented by the smybol P''.

As mentioned above, if the flow of fluid through the nozzle changes from supersonic to subsonic, a shock wave, represented by the reference symbol 14 in Figure 1, will be introduced at some point in the nozzle. In a conventional De Laval nozzle having an overexpanded discharge end 12, the shock wave will be introduced at some point downstream of the throat 13. If the pressure P'' at the discharge end 12 of the nozzle is maintained substantially constant, such as by discharging the fluid to the atmosphere, the position of the shock wave will move upstream or downstream as the pressure P' at the inlet end of the nozzle varies. More specifically, if under these conditions the pressure P' increases, the plane of the shock wave moves downstream, whereas if the pressure P' decreases the plane of the shock wave moves upstream.

Figure 2:
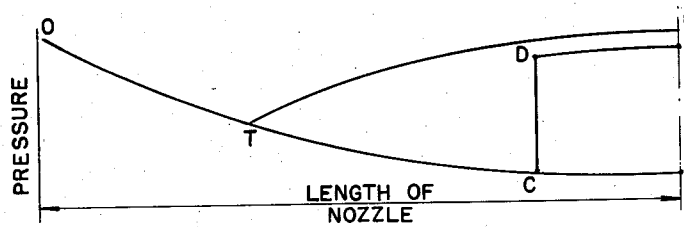
Figure 2 is a graphic representation of the pressure variation in the nozzle at various points along the length of the nozzle.

In Figure 2, O—T—G and O—T—B represent the variation in pressure along the length of the nozzle at constant entropy. The line O—T—G represents the pressure isentropic between the inlet end 11 of the nozzle and the discharge end 12 thereof at supersonic flow if the nozzle were properly expanded, i. e. P'' equals G. The line T—B represents the pressure isentropic at subsonic flow when P'' equals B. At supersonic flow beyond the throat, if the pressure P'' at the discharge end 12 of the nozzle is E, a shock wave 14 will be introduced in the nozzle, and the pressure increase at the plane of the shock wave is represented by the line C—D. When a shock wave is introduced in the nozzle, therefore, the pressure upstream of the shock wave will be represented by the line O—T—C, and the pressure downstream of the shock wave will be represented by the line D—E. Thus, the pressure in the nozzle downstream of the shock wave will be characterized by a relatively high pressure in comparison with the pressure immediately upstream of the shock wave.

The present invention utilizes this pressure differential immediately upstream and downstream of the shock wave to control the operation of an actuator 15. Accordingly, a pressure tap 16 is formed in the wall of the nozzle, and the pressure tap communicates with an actuator 15 (see Figures 3 and 4) via a conduit 17 so that any pressure change at the tap will be transmitted to the actuator. If P'' is maintained substantially constant, the position of the shock wave will depend on P', and if P' varies the variation will be reflected in a change in position of the plane of the pressure increase indicated by the line C—D. Since the pressure immediately upstream of the shock wave is much less than the pressure downstream thereof, the pressure variation at the tap 16 serves as an indication of whether the pressure P' is more or less than a predetermined value.

The actuator 15 may, if desired, regulate some safety device, such as a device to render inoperative the apparatus which changes the pressure P', or it may operate a warning device to issue an alarm that the pressure P' has been changed, or it may operate a control device to restore the pressure P' to its initial value. Moreover, if control at various pressures of P' is required, a series of taps can be provided at spaced intervals along the length of the nozzle passage.

Figure 3:
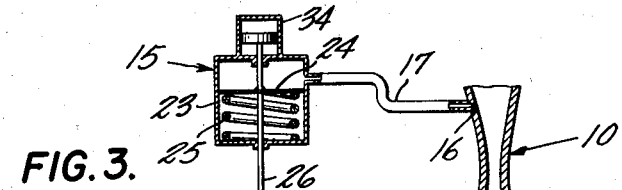
Figure 3 is a schematic representation of an application of the present invention in controlling the operation of a valve in the discharge line of a compressor.

A specific application of the present invention to a pressure regulating control system is illustrated in Figure 3. In this embodiment, the actuator 15 serves to control the adjustment of a valve 22 in the discharge conduit 20 of a compressor 21. The actuator may, it is understood, be triggered to close the valve 22 in the event the pressure in the conduit 20 rises above a predetermined value, or it may be triggered to open the valve in the event the pressure in the conduit 20 falls below a predetermined value.

The actuator 15 may be of conventional form; for example, it may comprise a cylinder 23, a movable diaphragm 24 within the chamber dividing it into upper and lower chambers, a compressible spring 25 in the lower compartment of the cylinder, and a rod 26 connecting the diaphragm with an arm 22a extending from the pivotal axis 22b of the valve. The conduit 17 connects the upper chamber of the cylinder with the pressure tap 16. When the pressure in the upper chamber is high, moving the diaphragm downwardly against the action of the spring, movement is transmitted to the valve to adjust it in one direction, and when the pressure in the lower chamber is low the spring moving the diaphragm upwardly transmits movement to the valve to adjust it in the opposite direction. Thus, the action of the spring 25 maintains the valve 22 in one position of adjustment when the pressure is low on the opposite side of the diaphragm, and the valve is adjustable to another position when the pressure acting on the diaphragm is high. The high and low pressure conditions, of course, depend on whether the shock wave 14 in the nozzle 10 is upstream or downstream of the pressure tap 16.

To prevent abrupt changes of the valve 22, the actuation of the diaphragm 24 may be dampened by the dash pot 34.

Figure 4:
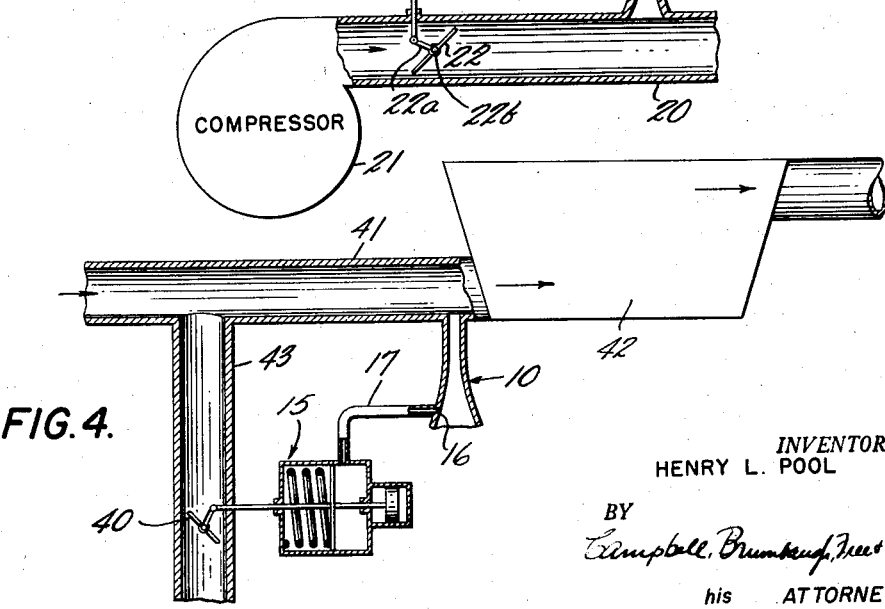
Figure 4 is a schematic representation of an application of the present invention in controlling the operation of a dump valve in the inlet conduit of a turbine.

Another application of the present invention is illustrated in Figure 4 of the drawings. In this case the actuator 15 operates a dump valve 40 in an exhaust conduit 43 leading off from the main inlet conduit 41 to the turbine 42. The valve 40 is normally closed. However, in the event of a predetermined increase in pressure in the conduit 41, the consequent movement of the shock wave relative to the tap 16 causes the valve 40 to open, relieving the pressure in the inlet conduit 41. When the pressure falls to a safe level, the valve 40 is automatically closed. This safety device prevents the occurrence of excessively high pressures in the inlet side of the turbine which might otherwise cause the turbine to run away or explode.

Since the creation of a shock wave requires that the velocity of the fluid beyond the throat be in the supersonic range, it is evident that the pressure P' must be substantially higher than the pressure P''. If the pressure P'' is atmospheric pressure, it is essential that the pressure P' be of a pressure range greater than two atmospheres (30 p. s. i.) so that supersonic flow can be obtained at the inlet end of the nozzle.

For a more complete understanding of the theory of producing shock waves, reference may be had to the textbook "Aerodynamics of a Compressible Fluid" by Liepmann & Puckett, Wiley, 1947.

The invention has been shown by way of example only, and obviously many modifications and variations may be made therein without departing from the spirit of the invention. It is understood, therefore, that the invention is not to be limited to any specific form or embodiment except in so far as such limitations are expressly set forth in the appended claims.

I claim:

1. In a pressure-regulating system, a main conduit in the system for conducting a fluid under pressure therethrough, a nozzle, the inlet end communicating with the fluid within the main conduit and the discharge end communicating with a pressure which is relatively constant and substantially less than the pressure in said main conduit, the pressure differential between said inlet and outlet ends producing a bleed from the main conduit through the nozzle to create a shock wave therein, said shock wave being characterized by a sharp increase in pressure downstream of the shock wave, the position of which varies in response to variation in the pressure to be regulated, a pressure-regulating device, an actuator for controlling the operation of said pressure-regulating device, a pressure tap in the wall of the nozzle, and a passage connecting the pressure tap and the actuator, whereby when the position of the shock wave is upstream of the pressure tap high pressure will be transmitted to the actuator through said passage, and when the plane of the shock wave is downstream of said pressure tap low pressure will be transmitted to the actuator through said passage.

2. A system as set forth in claim 1 wherein the pressure ratio across the nozzle exceeds two to one.

3. A system as set forth in claim 1 including means controlled by the operation of the actuator for regulating a valve.

4. A system as set forth in claim 1 including a second conduit connected to said main conduit upstream of said inlet end of said nozzle, a valve in said second conduit, and means controlled by the actuator in response to changes in the pressure of the main conduit for actuating the valve.

5. In a pneumatic system, a main conduit in the system for conducting a fluid under pressure therethrough, said pressure being at least two atmospheres, a bleed passage having a throat therein, the effective cross-sectional area thereof being substantially less than the effective cross-sectional area of the main conduit, the inlet end of the bleed passage communicating with the main conduit and the discharge end communicating with the atmosphere, whereby a relatively insignificant but constant leakage of the fluid flows through said bleed passage, said leakage flow of fluid producing a shock wave within said bleed passage beyond the throat thereof, an actuator, and a port in the wall of said bleed passage beyond the throat, said port communicating with said actuator, whereby when the position of the plane of the shock wave is upstream of the port pressure will be transmitted to the actuator through said port, and when the plane of the shock wave is downstream of said port low pressure will be transmitted to the actuator through said port.

6. In a pneumatic system which includes a turbine and a main feed conduit for conducting an impelling fluid to the turbine under relatively high pressure exceeding two atmospheres, a safety system comprising a dump conduit communicating with the main feed conduit, a normally closed valve in the dump conduit, an actuator for operating said valve, a bleed nozzle of the De Laval type, the inlet end thereof communicating with the impelling fluid flowing through the main feed conduit and the discharge end thereof communicating with the atmosphere, whereby a relatively insignificant but constant flow of the impelling fluid is permitted to leak to the atmosphere, said leakage flow of the impelling fluid producing a shock wave within said nozzle beyond the throat thereof, and a port in the wall of said nozzle, said port communicating with the said actuator, whereby the plane of the shock wave is normally disposed upstream of said port but whereby an increase in the pressure of the impelling fluid above a predetermined safe pressure will produce translation of the plane of the shock wave to the downstream side of the port, transmitting the increase in pressure to said actuator to open the valve in the dump conduit.

References Cited in the file of this patent

UNITED STATES PATENTS 2,169,175    Ziebolz et al.             Aug. 8, 1939

FOREIGN PATENTS 603,155    Great Britain            June 10, 1948
709,300    Great Britain            May 19, 1954
710,412    Great Britain            June 9, 1954